(12) United States Patent  
Yarnell

(10) Patent No.: US 6,846,504 B1  
(45) Date of Patent: Jan. 25, 2005

(54) METHOD OF COOKING COMPLETE MEAL IN ONE VESSEL

(76) Inventor: Elizabeth Gail Yarnell, 2511 Marion St., Denver, CO (US) 80205

( * ) Notice: Subject to any disclaimer, the term of this patent is extended or adjusted under 35 U.S.C. 154(b) by 397 days.

(21) Appl. No.: 10/198,812

(22) Filed: Jul. 19, 2002

(51) Int. Cl.$^7$ .................................................. A23L 1/01
(52) U.S. Cl. ....................................... 426/523; 426/509
(58) Field of Search ................................ 426/523, 508, 426/509, 510, 520

(56) References Cited

U.S. PATENT DOCUMENTS 5,567,458 A * 10/1996 Wu .............................. 426/523

* cited by examiner

Primary Examiner—George C. Yeung
(74) Attorney, Agent, or Firm—Henry L. Smith, Jr.

(57) ABSTRACT

A method of cooking a complete meal in one vessel involving placing specified types of foods in a specific sequence of layers within the vessel, along with appropriate flavorings, so that the various foods retain their separate flavors and structural integrity and can be served separately after cooking.

22 Claims, 1 Drawing Sheet

METHOD OF COOKING COMPLETE MEAL IN ONE VESSEL

BACKGROUND

1. Field of Invention

The field of the invention is a method for cooking a complete, nutritious, and generally lower fat meal in a single vessel.

2. Description of Prior Art

While the Applicant is not aware of any patents on previous methods, previous single vessel cooking methods include crock-pot, casserole, skillet, wok, and Indian clay pot cooking methods. None of these methods satisfies all the modern needs for speed, simplicity, and nutrition. Crock-pot cooking produces stews which involve mixing of the ingredients after typically six or more hours of slow cooking at a low temperature. Casseroles use the fat found in dairy products or processed foods such as condensed creamy soups to bind layers together into a single slab. The resulting slab means that the various ingredients cannot be served separately, and the flavors of all ingredients tend to blend together as they are consumed. Skillet and wok meals require constant supervision as well as a second vessel to prepare the rice or grain separately thus negating the concept of a one pot meal. The Indian clay pot method depends on moisture absorbed by the pot before cooking, and requires a significant amount of time in the oven. It imparts a unique clay pot flavor to all the food contained in the vessel—a flavor which not everyone likes. The method of the present invention is superior in speed, simplicity, ease, and nutrition. The Applicant believes that the method of the present invention is a novel one which can cook a complete meal consisting of an entree, starch, and vegetables side dishes simultaneously without mixing the various ingredients. Prior art cooking methods involved too much time, too many vessels, and are not adapted to natural unprocessed nutritious food components. Wok and stir-fry methods add undesirable fat to food. Many of the methods take a considerable amount of time to implement, typically much more than approximately 20 minutes preparation time and about 45 minutes baking time (for a 2 quart Dutch oven) required for the present invention.

The method of the present invention is not disclosed in any of the leading books of which the Applicant is aware. An important book on Dutch oven cooking is *Dutch Oven Cooking* by Ray Overton (Longstreet Press, 1998). Methods described in this book typically involve preparation of pasta or rice separately and multiple vessels to prepare a single meal. The recipes require multiple preparation steps, take more time to prepare, and most are performed on the stovetop rather than in an oven, and therefore require more supervision. A book entitled One Dish Dinners, by Better Homes and Gardens (Meredith Books, 2000), presents recipes prepared using a skillet, crock-pot, or grill. Many recipes require rice or pasta to be cooked separately. Cooking times can range up to 8½ hours. The title refers more to the presentation of the meal rather than to the method of cooking of the meal. A book entitled One Dish Meals Cookbook by Pillsbury (Clarkson Potter Publishers, 1999) involves recipes for casseroles, skillet dishes, and slow cooker meals. These recipes are substantially higher in fat or require prepared products. The Dutch oven/high heat cooking method of the present invention is not disclosed in these books.

SUMMARY OF INVENTION

The method of the invention is to cook complete meals in a single vessel by layering various foods in a certain order within the vessel so that the various foods do not disintegrate and mix with each other, so that their flavors do not completely blend and so that they can be served separately after cooking. The method involves cooking in a single closed vessel in a conventional oven at high heat for an hour or less. The method typically includes an entree, a starch, and vegetable side dishes.

OBJECTS AND ADVANTAGES

The objects of the present invention are:
1. To conveniently and quickly cook a complete meal in a single vessel and thus avoid the necessity of washing several vessels.
2. To conveniently and quickly cook generally complete meals, including a meat or other protein source, grains, pasta, or beans and various vegetables and spices in a single vessel.
3. To conveniently and quickly cook generally lower fat meals in a single vessel, as compared to crock-pot, casserole, wok, or stir-fry methods.
4. To conveniently and quickly cook a meat and several kinds of vegetables at once without causing the food items to disintegrate or mix with each other so that they can be served separately.
5. To conveniently and quickly cook a complete meal in one vessel in an oven with minimal supervision, or no supervision, of the cooking during the entire cooking process.
6. To conveniently and quickly cook a complete meal in a commonly available vessel such as a Dutch or French oven made of steel, raw cast iron, or cast iron coated with enamel, Teflon, or other nonstick coating.
7. To conveniently and quickly cook a complete meal together with appropriate spices and flavoring for a variety of cuisine options.
8. To provide a method for quickly cooking a complete meal at the end of the day without using a number of vessels, and in a manner which allows for the meal to be assembled at the beginning of the day or the day before cooking, and stored in a refrigerator until cooked shortly before mealtime.
9. To provide alternatives to eating processed, prepackaged foods which may be high in fat or artificial additives and low in nutrition.
10. To provide a superior cooking method to the crock-pot method, which produces a mixed stew after a long period of cooking.
11. To provide a method of cooking superior to the casserole method which uses fat from dairy products or processed foods.
12. To provide a cooking method superior to skillet and wok cooking which require constant supervision as well as multiple cooking vessels.
13. To provide a method of cooking superior to the Indian clay pot method which depends on moisture absorbed by the pot before cooking, and which requires a long period of cooking and which imparts a unique clay pot flavor which many people do not like.
14. To provide a convenient cooking method using whole, unprocessed, natural ingredients such as whole fresh vegetables, natural grains, etc. and avoiding processed food and additives and preservatives.
15. To provide a convenient cooking method using a specified ratio of liquid and pasta, grains, or beans and the like which avoids ending with excess liquid or uncooked pasta, grains, or beans.
16. To provide a tasty way of preparing whole vegetables without adding undesirable fat.

17. To avoid the merging of food items and flavors which results from the crock-pot cooking or casserole baking methods.
18. To provide a cooking method in which overcooking is very unlikely.
19. To provide a cooking method which is adapted to a wide range of food items and ethnic cultures.
20. To provide a cooking method where fixed recipes are not necessary, and which utilizes whatever foods happen to be available.
21. To provide virtually endless flavor options to avoid monotony in food preparation.
22. To provide a cooking method involving reduced fat and calories yet substantial vitamins, minerals, fiber, and other nutrients.
23. To increase intake of fresh unprocessed vegetables by making them more appetizing. Still further objects and advantages will become evident from the detailed description of the invention, and the drawings.

DRAWING FIGURES

Figure 1:
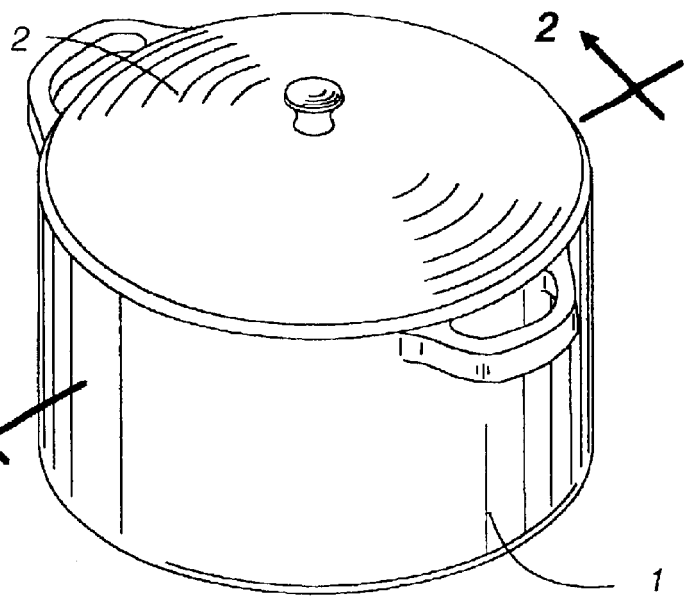
FIG. 1 shows the cooking vessel.

REFERENCE NUMERALS IN DRAWINGS 1. wide flat-bottomed vessel
2. heat safe lid
3. extruded internal ridge on lid
4. firm vegetables
5. grains, pasta or beans, with liquid
6. aromatic vegetables
7. meat, fish, poultry or meat substitute
8. root vegetables or tubers
9. firm vegetables
10. leafy or soft vegetables
11. flavorings

DETAILED DESCRIPTION OF THE DRAWINGS

Figure 2:
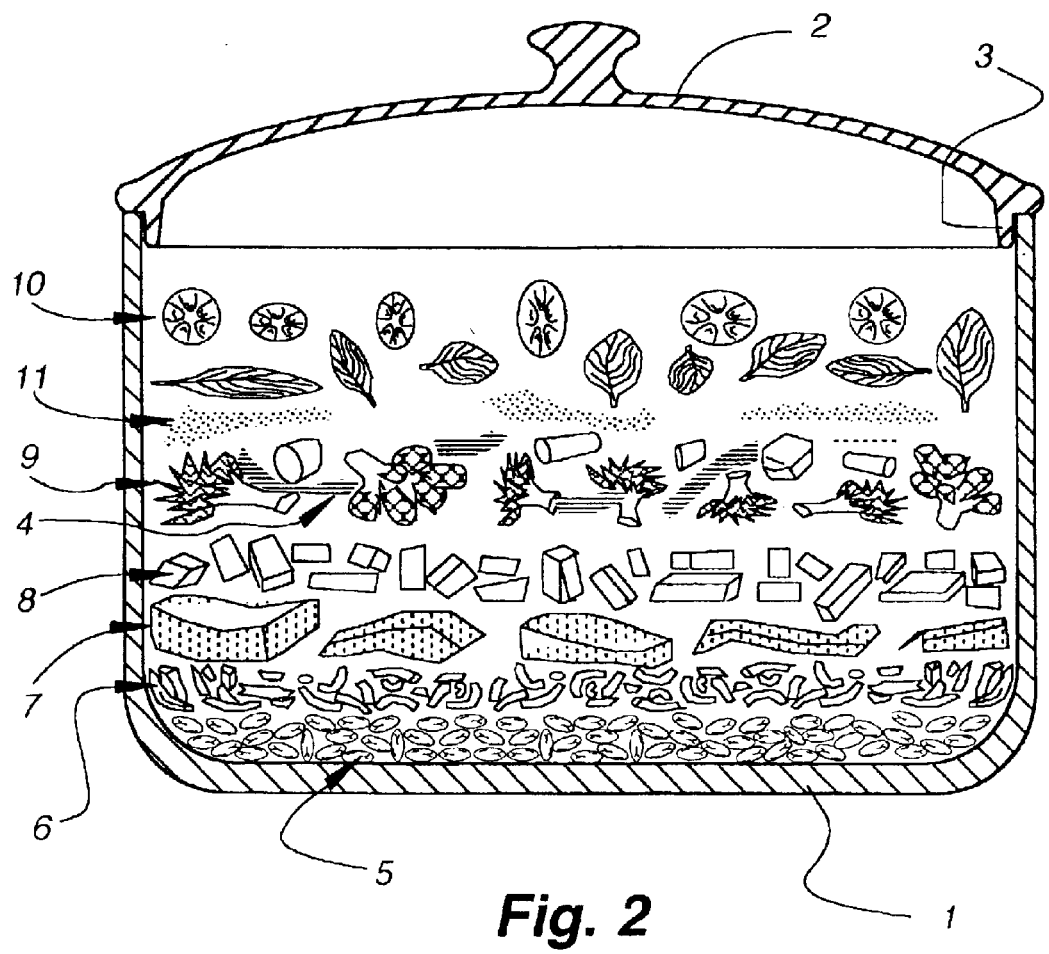
FIG. 2 shows specific foods arranged in layers in a specific order within the vessel.

FIG. 1 shows the cooking vessel 1 with wide, flat-bottom, and heat safe lid 2. FIG. 2 is a cross section view showing how foods are arranged in layers in the vessel. At the bottom of the vessel there is a layer, 5, of grains, beans or pasta with liquid. The next layer comprises aromatic vegetables, 6. The next layer comprises meat, fish, poultry, or meat substitute, 7. The next layer comprises root vegetables or tubers, 8. The next layer comprises firm vegetables, 4 and 9. The next layer comprises leafy or soft vegetables, 10. The next layer comprises flavorings, 11.

DESCRIPTION—PREFERRED EMBODIMENT

In the preferred embodiment of the present invention, the cooking vessel would be a commonly available Dutch (round) or French (oval) oven made of steel, raw cast-iron, or cast-iron coated with a nonstick material such as enamel, Teflon, or other nonstick coating. The bottom and lid of the vessel are coated inside with a vegetable cooking oil. The vessel would preferably have a wide flat-bottom, and a heat safe lid, typically of the same or similar material or heat resistant glass. The bottom portion of the vessel and the lid would preferably involve an extruded internal ridge which projects downwardly from the circumference of the underside of the lid and fits snugly inside the circumference of the bottom cavity of the vessel, so that the lid is in a secure position on top of the bottom of the vessel and provides a reasonably tight seal between the bottom of the vessel and the lid, while at the same time allowing a certain amount of steam to escape from the cooking vessel as cooking is completed. Unprocessed ingredients are laid in layers in the base of the pot after it is sprayed with a thin coating of vegetable oil. First the dry, raw pasta, beans, or grains are placed in the pot with the liquid according to a predetermined liquid to grain ratio that is dependent upon the grain used. Grains can include, but are not limited to, cous cous, pasta, bulgher, millet, quinoa, polenta, beans, and lentils. The grains are then spread evenly across the base of the vessel, and the appropriate amount of liquid is added. The amount of liquid is based upon a preset, customized grain to liquid ratio depending upon the grains. Then a layer of aromatic vegetables is added. These may be onions, leeks, scallions, shallots, garlic or other aromatics which are sprinkled in and among the grains or used as a base layer if no grains are desired in the meal. The next step is to add the meat or meat substitute. This may be fish, poultry, seafood, beef, pork, or other meat products, or meat substitutes such as tofu, seitan, tempeh, etc. Next, the root vegetables or tubers are cut into cubes about one inch per side, ½ inch slices, or ½ inch thick fingerlings. These vegetables need not be peeled, provided they have been well scrubbed or washed. This category includes, but is not limited to, carrots, yams, potatoes, sweet potatoes, parsnips, rutabaga, turnips, beets, radishes, celery root, Jerusalem artichokes, ginger root, etc. The next layer is the firm vegetables such as Brussels sprouts, green beans, broccoli, asparagus, corn, bell peppers, squash, mushrooms, peas, eggplant, artichokes, cauliflower, celery, okra and seaphire, etc. The final layer is comprised of leafy vegetables such as spinach, cabbage, kale, chard, bok choy, kohlrabi, broccoli, bean sprouts, collard greens, beet greens, turnip greens, and mustard greens or soft vegetables or fruits such as tomatoes or avocados. The flavorings of herbs or sauces (typically fresh or dried herbs, a vinaigrette marinade, or mix of dried spices) are interspersed among the layers. Dry or fresh herbs are sprinkled in and among the ingredients while sauces and marinades are drizzled throughout. Slices of citrus fruits or chili peppers may be interspersed throughout, if desired. Finally, the interior of the lid is sprayed with a thin coat of vegetable oil for nonstick purposes, and the lid is set on top of the base. The preferred embodiment of the invention would involve cooking the above closed vessel filled with specified foods in layers inside a conventional baking oven at 450 degrees for 30 to 90 minutes depending on the size of the cooking vessel and the amount and state of the food items (fresh or frozen). The baking process extends for typically 45 minutes or fewer minutes for a two quart Dutch oven with 10 minutes being added for each additional quart capacity. The cooking process involves a specific ratio of liquid, typically water or broth, etc. to grains, pasta or beans in order to cook the grains, etc. perfectly without an excess of liquid remaining or uncooked grains, etc. after the cooking process. The entree of the meal typically comprises a meat, poultry, fish, or meat substitute. The starch is comprised of grains, pasta, or tubers. Various unprocessed whole vegetable are used. Flavoring is added through limited use of herbs, spices, sauces such as soy sauce, or combinations thereof in the form of marinades. In the method of the preferred embodiment, meat and fish remain intact, pasta remains pasta shaped and even delicate vegetables such as leafy vegetables or tomato slices emerge intact for serving. The ingredients become infused with selected flavors and emerge moist, tender, and perfectly cooked, typically after a relative short time, usually under one hour. The time to assemble the foods in the vessel for cooking is typically under 20 minutes. The assembly can be done in advance, and the foods stored in a refrigerator prior to cooking.

An important parameter of the method of the present invention is the ratio of liquid added to the pasta, beans or grain, so that the pasta, beans or grain is completely cooked, yet little or no liquid is left after cooking. These ratios can be easily determined by simple trial and error, but the Applicant suggests the following ratios based on her experience. These ratios assume a 2 quart Dutch oven and ingredients for serving two people.

pasta 1 cup liquid ⅓ cup
rice 1 cup liquid 1 cup
cous cous ½ cup liquid ½ cup
quinona ¾ cup liquid 1 cup
polenta ½ cup liquid 1½cup
barley ¼ cup liquid ½ cup
lentils ½ cup liquid 1 cup The liquid can be water, broth, soy sauce or a marinade or vinaigrette dressing composed primarily of water, etc.

OPERATION OF THE INVENTION

The method of the invention is as follows. Specified types of foods are placed in the vessel in the above described order of layers, including flavoring layers, and a specified amount of water is added in the bottom of the vessel depending on the nature and amount of grains, etc. in the vessel. The covered vessel is then placed in a baking oven at approximately 450 degrees and cooked for 30 to 90 minutes depending on the nature of the foods in the vessel and their state—either fresh or frozen. During this process, the water in the bottom of the vessel vaporizes and steam permeates and is absorbed by the various layers and thus contributes to the cooking of the various foods. A small amount of steam may escape between the bottom of the vessel and the lid if enough steam pressure develops. The flavorings under the influence of the steam release their flavor ingredients which permeate the various layers. Because specific foods are placed in layers in a specific sequence, these foods do not mix with each other during the cooking process, and they do not disintegrate or lose their texture so that they can be served separately. The grains are generally placed on the bottom because they are tougher and do not disintegrate, and they need to rest in liquid in order to fully hydrate. The more delicate vegetables are placed in the higher layers so that they do not disintegrate or slump downward into the mixture or become compressed because of the weight of vegetables above them. Preferably, the root or tuber vegetables are placed toward the bottom of the vessel while the more delicate vegetables such as tomatoes and spinach and other leafy vegetables are placed in a layer toward the top where they will not get compressed or dispersed by the weight of the food above them. Finally, another layer of seasonings or flavorings can be added as a top layer if desired. The doneness of the food is evaluated by a substantial aroma escaping from the vessel. The cooked components retain their integrity and can be removed individually from the vessel with tongs for serving as an entree of meat or meat substitute, a side dish of grains or pasta or tubers, and a selection of vegetable side dishes.

TESTS

A test was conducted using a 2-quart capacity cast iron, enamel-coated round Dutch oven by Le Creuset. The ingredients used were as follows:
½ cup cous cous, dry
½ cup water
2 pieces chicken
½ tsp. salt
¼ tsp. lemon pepper
1 avocado, firm-ripe
½ bell pepper, green, seeded, cut in wedges
½ cup olives, small, ripe, pitted
½ onion, chopped
1 tsp. celery salt
¼ tsp. marjoram, dried
1 Tbs. dry sherry
1 Tbs. lemon juice Applicant sprayed the inside of the Dutch oven and interior of the lid with a thin coat of olive oil. Applicant then poured dry cous cous into the bottom of the pot, and then added ½ cup water and used a spatula to evenly distribute grains across bottom. This layer was about ½" thick measured from the top of the water. Then Applicant arranged the chicken breasts atop the cous cous and water mixture. The breasts sank into the water by about ¼", resulting in a layer about ¾" thick, depending upon the thickness of the chicken. Applicant seasoned the breasts with salt and lemon pepper.

Applicant followed with single layers of green pepper wedges, tomato slices, and sliced olives. The final layer was of slices of avocado. These layers varied in thickness from about ¼" to 1", and the olives became interspersed throughout the crevices. In a small bowl, Applicant combined the onion, celery salt, basil, marjoram, sherry, and lemon juice to make a marinade that was poured on top of all the layers.

Applicant covered the pot, ensuring that the lid was on securely and baked it in a conventional oven at 450 degrees Fahrenheit for 45 minutes, which was about 3 minutes after the aroma first wafted from the oven indicating that the meal was fully cooked.

Applicant did not lift the lid during cooking. When Applicant lifted the lid to serve the meal, Applicant used tongs to gently remove the upper layers. The avocado slices emerged tender and intact, having turned a slightly darker green than when raw. The tomato slices also remained intact and lifted out easily with tongs. The green pepper wedges had softened from their raw state, yet still emerged with the crispness often found from steaming the vegetable. Each chicken breast lifted out whole and intact. The meat was white all the way through and the chicken was tender enough to cut with a fork. The effect on the chicken was similar to being slightly poached in that it was not compacted and in fact was a little puffy, yet it was not entirely waterlogged nor was it stringy like a boiled chicken. Finally, Applicant used a heat-safe plastic serving spoon to scoop out the cous cous and mound it on the plates. The cous cous grains each puffed up producing a light and fluffy accompaniment to the meal. The cous cous had absorbed the flavor of the marinade and was flavorful.

ADDITIONAL EMBODIMENTS

The cooking process can be a solution for allergen-free dietary requirements such as wheat-free, egg-free, or dairy-free meals. This process is intended to be flexible and adaptable to any kind of alternative dietary practice including but not limited to vegetarianism, veganism, and macrobiotic diets. A large number of variations and combinations of meat, meat substitutes, grains, and vegetables are possible while remaining within the spirit of this invention. Numerous combinations of flavorings of food items are possible depending on individual tastes.

CONCLUSIONS, RAMIFICATIONS AND SCOPE

A number of changes are possible to the ingredients and methods described above, while still remaining within the scope and spirit of the invention. The invention is intended to offer greater flexibility in ingredients and flavors to accommodate a very wide range of cuisines and individual preferences, and a wide range of available foods. The specifics about the form of the invention described in this application are not intended to be limiting the scope. The scope of the invention is to be determined by the claims, and their legal equivalents, not the examples given above.

I claim:

1. A method for cooking a substantially complete meal in a single closable vessel comprising the steps of:
   (a) placing selected foods in the vessel in layers in a specified order depending on the structural strength and cooking characteristics of the foods selected,
   (b) adding liquid substantially comprised of water to the vessel in an amount selected to correspond to the absorption and cooking characteristics of the food in the bottom layer in the vessel,
   (c) substantially closing the vessel, and
   (d) cooking the closed vessel in an oven until the food is done,
whereby the foods are uniformly cooked and are kept separate and retain their structural integrity so that they can be removed from the vessel and served separately.

2. The process of claim 1, wherein the food in the bottom layer comprises one or more foods selected from the group consisting of: grains, pasta, and beans.

3. The process of claim 1, wherein the food in the top layer comprises one or more leafy or soft foods selected from the group consisting of: spinach, cabbage, kale, chard, fruits, tomatoes, avocados, bok choy, kohlrabi, broccoli, bean sprouts, collard greens, beet greens, turnip greens, and mustard greens.

4. The process of claim 1, wherein the food in the next to bottom or second next-to-bottom layer comprises one or more foods selected from the group consisting of: meat, fish, poultry, and meat substitute including tofu, seitan, and tempeh.

5. The process of claim 1, wherein the food in the next-to-bottom layer comprises one or more aromatic vegetables selected from the group consisting of: onions, leeks, scallions, garlic, shallots and similar aromatic vegetables.

6. The process of claim 1, wherein the food in the second-from-top or third-from-top layer comprises one or more vegetables selected from the group consisting of root vegetables and tubers.

7. The process of claim 1, wherein the food in the second-from-top or third-from-top layer comprises one or more vegetables selected from the group consisting of: Brussels sprouts, green beans, broccoli, asparagus, corn, bell peppers, squash, mushrooms, peas, eggplant, artichokes, cauliflower, celery, okra and seaphire.

8. The process of claim 1, wherein foods are layered in the following order from bottom to top:
   (a) grains, pasta, or beans,
   (b) root vegetables or tubers,
   (c) firm vegetables selected from the group consisting of: Brussels sprouts, green beans, broccoli, asparagus, corn, bell peppers, squash, mushrooms, peas, eggplant, artichokes, cauliflower, celery, okra and seaphire, and
   (d) leafy or soft foods selected from the group consisting of spinach, cabbage, kale, chard, fruits, tomatoes, avocados, bok choy, kohlrabi, broccoli, bean sprouts, collard greens, beet greens, turnip greens, and mustard greens.

9. The process of claim 1, wherein foods are layered in the following order from bottom to top:
   (a) grains, pasta, or beans,
   (b) fish, meat, poultry, or meat substitute including tofu, seitan, and tempeh,
   (c) firm vegetables selected from the group consisting of: Brussels sprouts, green beans, broccoli, asparagus, corn, bell peppers, squash, mushrooms, peas, eggplant, artichokes, cauliflower, celery, okra and seaphire, and
   (d) leafy or soft foods selected from the group consisting of spinach, cabbage, kale, chard, fruits, tomatoes, avocados, bok choy, kohlrabi, broccoli, bean sprouts, collard greens, beet greens, turnip greens, and mustard greens.

10. The process of claim 1, wherein foods are layered in the following order from bottom to top:
    (a) grains, pasta, or beans,
    (b) one or more aromatic vegetables selected from the group consisting of onions, leaks, scallions, garlic, shallots and similar aromatic vegetables,
    (c) meat, fish, poultry, or meat substitute including tofu, seitan, and tempeh,
    (d) root vegetables or tubers,
    (e) firm vegetables selected from the group consisting of: Brussels sprouts, green beans, broccoli, asparagus, corn, bell peppers, squash, mushrooms, peas, eggplant, artichokes, cauliflower, celery, okra and seaphire, and
    (f) leafy or soft foods selected from the group consisting of: spinach, cabbage, kale, chard, fruits, tomatoes, avocados, bok choy, kohlrabi, broccoli, bean sprouts, collard greens, beet greens, turnip greens, and mustard greens.

11. The process of claim 10, further comprising as a top layer one or more flavorings comprising fresh or dried spices.

12. The process of claim 1, wherein the vessel is cooked in an oven for between 30 and 90 minutes, and at a temperature between 350 and 500 degrees Fahrenheit.

13. The process of claim 1, wherein the vessel is closed tightly enough to retain substantially all of the water or steam during cooking, while allowing a small amount of steam to escape during cooling if the vessel develops sufficient internal steam pressure.

14. The process of claim 1, wherein the amount of liquid is matched to the food selected for the bottom layer, whereby the food in the bottom layer absorbs some liquid and is completely cooked, yet little or no liquid is left in the bottom of the vessel after the cooking is complete.

15. The process of claim 1, wherein the single closable vessel is a round Dutch oven, or an oval French oven, or similar substantially flat-bottomed cooking vessel with a lid.

16. The process of claim 15, wherein the lid of the vessel is adapted to remain securely in place on the bottom of the vessel, yet the lid can allow some steam to escape during cooking if steam pressure develops in the vessel.

17. The process of claim 1, wherein the inside of the vessel is coated with a nonstick material comprising Teflon, or enamel, or is coated prior to cooking with cooking oil.

18. A method for cooking a variety of foods for one meal in a single closable vessel comprising the steps of:
    (a) placing foods in layers so that the cooked foods with most structural integrity are in the lower layers and the cooked foods with lesser structural integrity are in the upper layers,
    (b) placing grains, pasta, or beans in the bottom layer,
    (c) adding liquid substantially comprised of water to the vessel in an amount selected to correspond to the absorption and cooking characteristics of the food in the bottom layer in the vessel, (d) substantially closing the vessel, and (e) cooking the closed vessel in an oven until the food is done, whereby the foods are uniformly cooked and are kept separate and retain their structural integrity so that they can be removed from the vessel and served separately.

19. The process of claim 18, wherein the food in the next-to-bottom layer comprises meat, fish, poultry, or meat substitute including tofu, seitan, and tempeh.

20. The process of claim 1 wherein, for a 2 quart vessel and a bottom layer of food comprising grains, pasta, or beans in a layer between ½ inch and 1½ inches thick, the amount of liquid is between ⅓ and 1½ cups, and wherein the amount of liquid is proportionately larger or smaller in the ratio of the volume of other vessels compared to the two quart vessel.

21. The process of claim 6, wherein the vegetables in said layer are cut into substantially cube shaped portions between ½ and 1½ inches on a side, or slices between ¼ inch and one inch thick, or substantially rectangular fingerlings between ½ and 1½ inch on a side.

22. The process of claim 8, wherein the root vegetables or tubers are cut into substantially cube shaped portions between ½ and 1½ inches on a side, or slices between ¼ inch and one inch thick, or substantially rectangular fingerlings between 12 and 1½ inch on a side.

* * * * *